US006629592B2

(12) United States Patent
Bernard et al.

(10) Patent No.: US 6,629,592 B2
(45) Date of Patent: Oct. 7, 2003

(54) SORT BIN FOR LUMBER PIECES (75) Inventors: Frank Bernard, St-Thomas-Didyme (CA); Michael St-Pierre, Normandin (CA)

(73) Assignee: Gemofor Inc., Quebec (CA)

( * ) Notice: Subject to any disclaimer, the term of this patent is extended or adjusted under 35 U.S.C. 154(b) by 0 days.

(21) Appl. No.: 09/931,515

(22) Filed: Aug. 16, 2001

(65) Prior Publication Data

US 2003/0034224 A1 Feb. 20, 2003

(51) Int. Cl.$^7$ ............................................. B65G 37/00
(52) U.S. Cl. .................. 198/360; 198/370.01; 209/512; 209/521
(58) Field of Search ............................ 198/360, 370.01, 198/601; 209/517, 518, 520, 521

(56) References Cited

U.S. PATENT DOCUMENTS

| | | | |
|---|---|---|---|
| 2,998,133 A | 8/1961 | Rambo | 209/90 |
| 3,653,506 A * | 4/1972 | Turner et al. | 209/518 |
| 3,653,606 A | 4/1972 | Sheets, Jr. | 242/86.8 |
| 3,696,948 A | 10/1972 | Murdoch et al. | 214/16 |
| 3,700,120 A * | 10/1972 | Romick et al. | 209/517 |
| 3,789,980 A * | 2/1974 | Nagy | 209/518 |
| 3,913,744 A | 10/1975 | Turner et al. | 209/74 |
| 4,195,737 A | 4/1980 | Rysti | 209/521 |
| 4,281,953 A | 8/1981 | Newnes | 414/268 |
| 4,815,917 A | 3/1989 | Newnes | 414/268 |

FOREIGN PATENT DOCUMENTS

CA          1264772        1/1990

* cited by examiner

Primary Examiner—Joseph E. Valenza
(74) Attorney, Agent, or Firm—Ware, Fressola, VDS & Adolphson LLP (57) ABSTRACT

A sort bin for unloading sorted lumber pieces on a conveyor comprises a compartment having first and second spaced-apart walls for containing the lumber pieces in a pile, an entry located at an upper portion of the compartment for introducing lumber pieces, and an exit located at a bottom portion, the conveyor being below the exit and spaced apart therefrom. A support for supporting the pile of lumber pieces is movable along a course extending between an upper position adjacent to the entry and a lower position below the exit of the compartment, and has side members for preventing a spill of lumber pieces on the conveyor when the support is in its lower position. One of the side members is pivotable between a standard position and an unloading position.

7 Claims, 7 Drawing Sheets

PRIOR ART

SORT BIN FOR LUMBER PIECES

FIELD OF THE INVENTION

The present invention generally relates to an apparatus for sorting lumber pieces, wherein lumber pieces having similar characteristics are dropped in one of a plurality of consecutive sort bins which are disposed one after the other. More particularly, it relates to a sort bin for unloading sorted lumber pieces on a conveyor.

BACKGROUND

Figure 6:
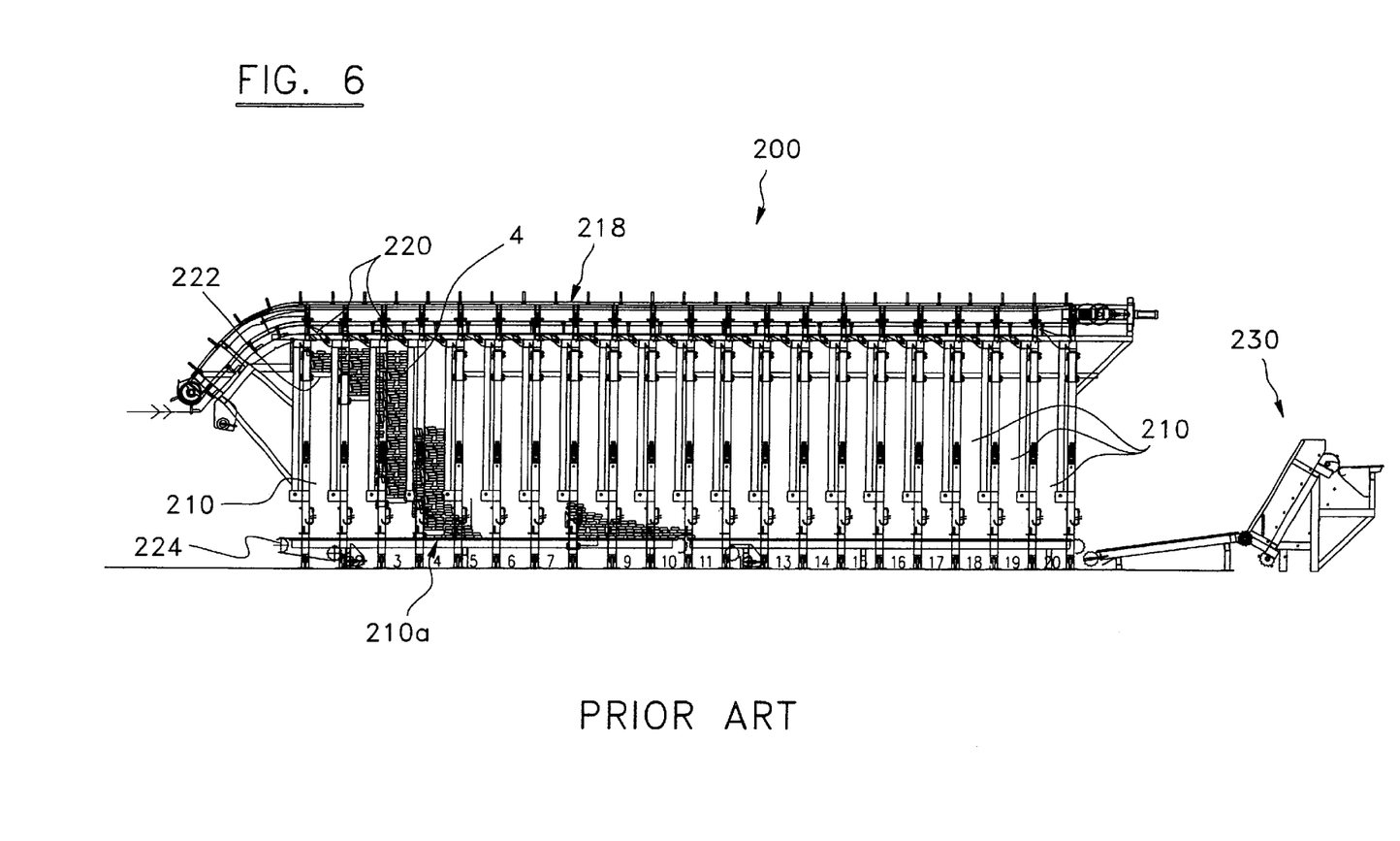
FIG. 6 is a side elevation view of a prior art lumber sorter.

Commonly used in lumber mills, there are apparatuses, called lumber sorters, used for sorting lumber pieces according to their characteristics, such as their section (ex. 1×3, 2×4, 2×6, etc.), their length or their general appearance. Known lumber sorters generally comprise a plurality of consecutive sort bins, each having an entry at an upper end portion for receiving lumber pieces dropped from an upper conveyor. A support movable between a raised position and a lower position is usually provided between the walls of each sort bin for supporting the lumber pieces therein. The support lowers gradually as the sort bin is filled up with more lumber pieces. When a given quantity of lumber pieces has been collected in a sort bin, this quantity is unloaded on a conveyor situated beneath the sort bin and spaced apart therefrom to be transported to a location where the lumber pieces are further handled. Referring to FIG. 6, an example of a prior art lumber sorter is illustrated. The sorter (200) comprises a plurality of consecutive sort bins (210) (only four of which are designated with the numeral reference 210). Each sort bin (210) has an entry at an upper end thereof for receiving lumber pieces (4) directed over the sorter (200) by means of an upper conveyor (218), such as a lug chain conveyor, as illustrated. More particularly, in the sorter (200) illustrated, a floor extending over the sorter (200) supports the unsorted lumber pieces (4) as they are being pushed by the lug chain conveyor (218). A controllable trap opening (220) in the floor is provided over the entry of each sort bin (210). When a lumber piece (4) reaches its respective sort bin (210), the corresponding trap opening (220) opens and the lumber piece (4) falls into the sort bin on a support (222) extending between the walls of the sort bin (210). The support (222) lowers gradually as the sort bin (210) is filled up with more lumber pieces (4) and until it reaches an unloading conveyor (224) disposed below the sort bin (210) spaced apart therefrom. Then, the lumber pieces (4) are discharged on the unloading conveyor (224) and directed to another lumber station (230) such as, for example, a pile station. As can be appreciated from FIG. 6, when the support (222) lowers further below the lower end of the sort bin (210), as in the sort bin designated by numeral reference (210a), there is no more lateral support for the lumber pieces (4) at the bottom of the pile, which thus tend to spill out and fall on the unloading conveyor (224), and that, before the support (222) has reached the unloading conveyor (224). One drawback is that sometimes, one or more of those spilled lumber pieces end up under the support (222) (see sort bin 210a) and get trapped between the conveyor (224) and the support (222), which often causes a stop in the production.

Prior attempts to resolve that problem are disclosed for example in U.S. Pat. No. 4,815,917 or 4,195,737. U.S. Pat. No. 4,815,917 discloses a bin sorter with a plurality of sort bins, each having a bin floor which can be lowered to a lumber discharge station and a series of rotatable gates extending from the bottom of each bin wall and functioning to control the discharge of lumber from the individual bins; and U.S. Pat. No. 4,195,737 discloses a bin sorter with a plurality of inclined bins with pivotable gates extending from the bottom of each bin wall.

Other examples of bin sorters for lumber pieces are given in the following U.S. Pat. Nos. 2,998,133; 3,696,948; 3,913,744; and 4,281,953.

SUMMARY OF THE INVENTION

An object of the present invention is to propose a sort bin that can inexpensively and efficiently sort lumber pieces.

Another object of the invention is to propose a sort bin that can efficiently prevent stops in the production caused by spillage of the lumber pieces.

In accordance with the present invention, these objects are achieved with a sort bin for unloading sorted lumber pieces on a conveyor. The sort bin comprises a compartment having first and second spaced-apart walls for containing the lumber pieces in a pile, an entry located at an upper portion of the compartment for introducing lumber pieces into the compartment and an exit located at a bottom portion of the compartment, the conveyor being below the exit and spaced apart therefrom. The sort bin further comprises a support for supporting the pile of lumber pieces contained in the compartment, the support being movable along a course extending between an upper position adjacent to the entry and a lower position below the exit of the compartment. The support has side members for preventing a spill of lumber pieces on the conveyor when the support is in its lower position, one of the side members being pivotable between a standard position and an unloading position. The sort bin also comprises means for moving the support between the upper and lower positions and pivoting means for pivoting the pivotable side member of the support between the standard position where a bottom end portion of the pile is held and the unloading position where the lumber pieces of the pile are unloaded on the conveyor.

The present invention also concerns a sorter for lumber pieces comprising a plurality of consecutive sort bins as described above.

The invention and its advantages will be better understood upon reading the non restrictive description of a preferred embodiment of the present invention. This description is given with reference to the appended drawings.

DETAILED DESCRIPTION OF A PREFERRED EMBODIMENT OF THE INVENTION

Figure 1:
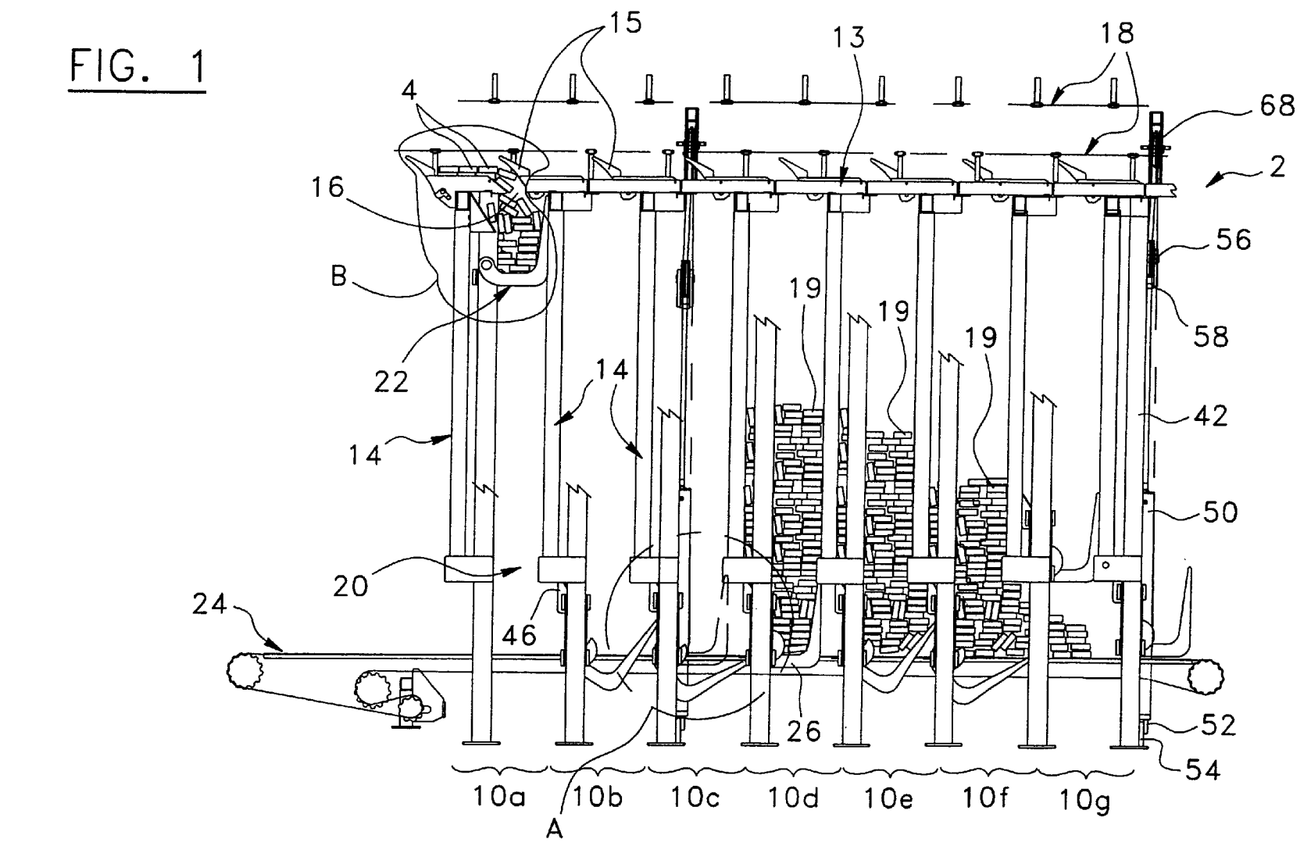
FIG. 1 is a side elevation view of a lumber sorter embodying a plurality of sort bins according to a preferred embodiment of the invention, the encircled portion B of this view being shown in cross section.
Figure 2:
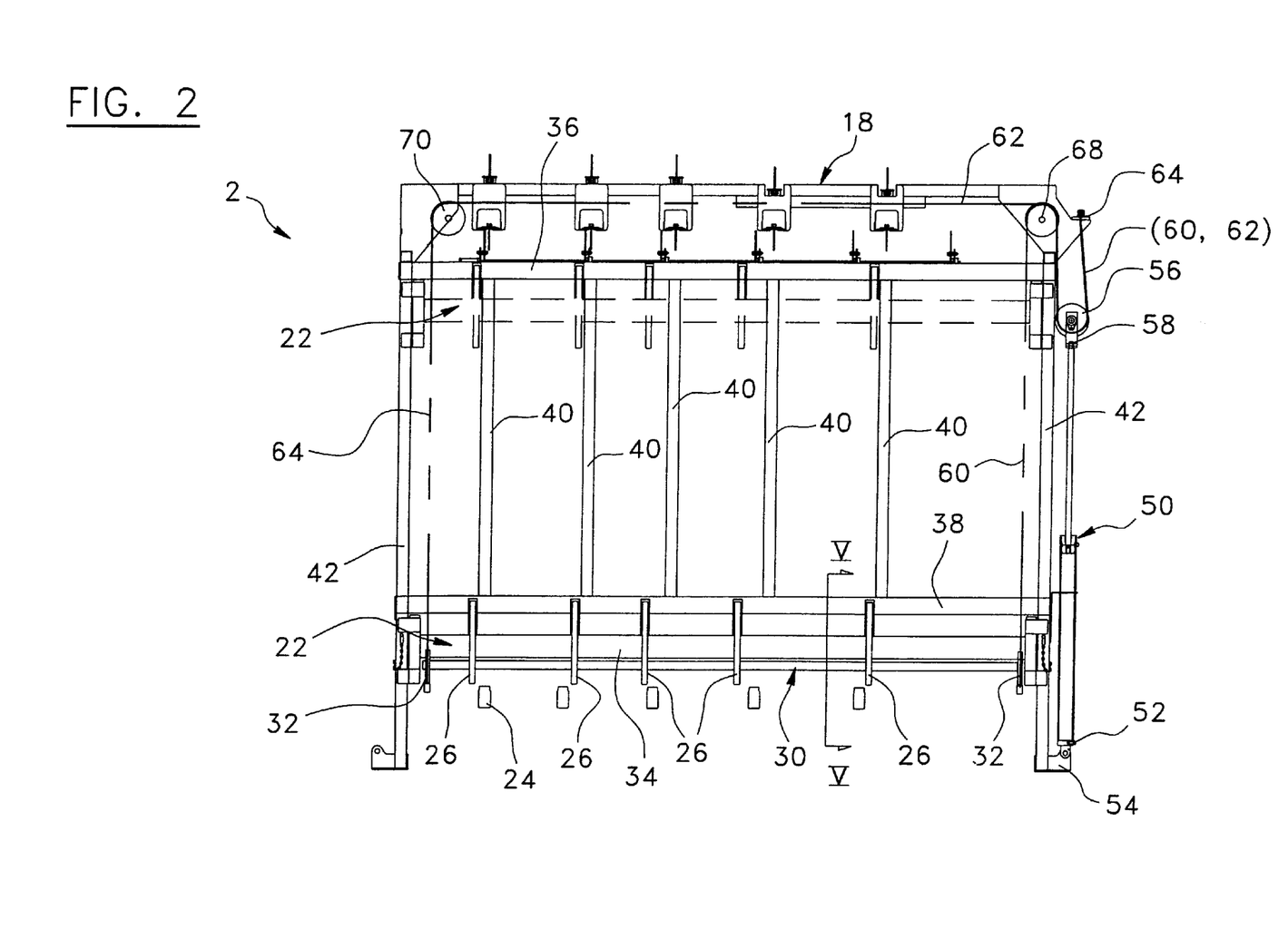
FIG. 2 is the front view of the lumber sorter shown in FIG. 1, viewed from the right side thereof.

Referring to FIGS. 1 and 2, a lumber sorter (2) including a plurality of consecutive sort bins (10a to 10g), according to a preferred embodiment of the present invention, is illustrated. In order not to surcharge the figures with numeral references, some elements are not referred to in some figures if they are clearly identified in other figures. Also, some elements have been omitted for sake of clarity.

Figure 3:
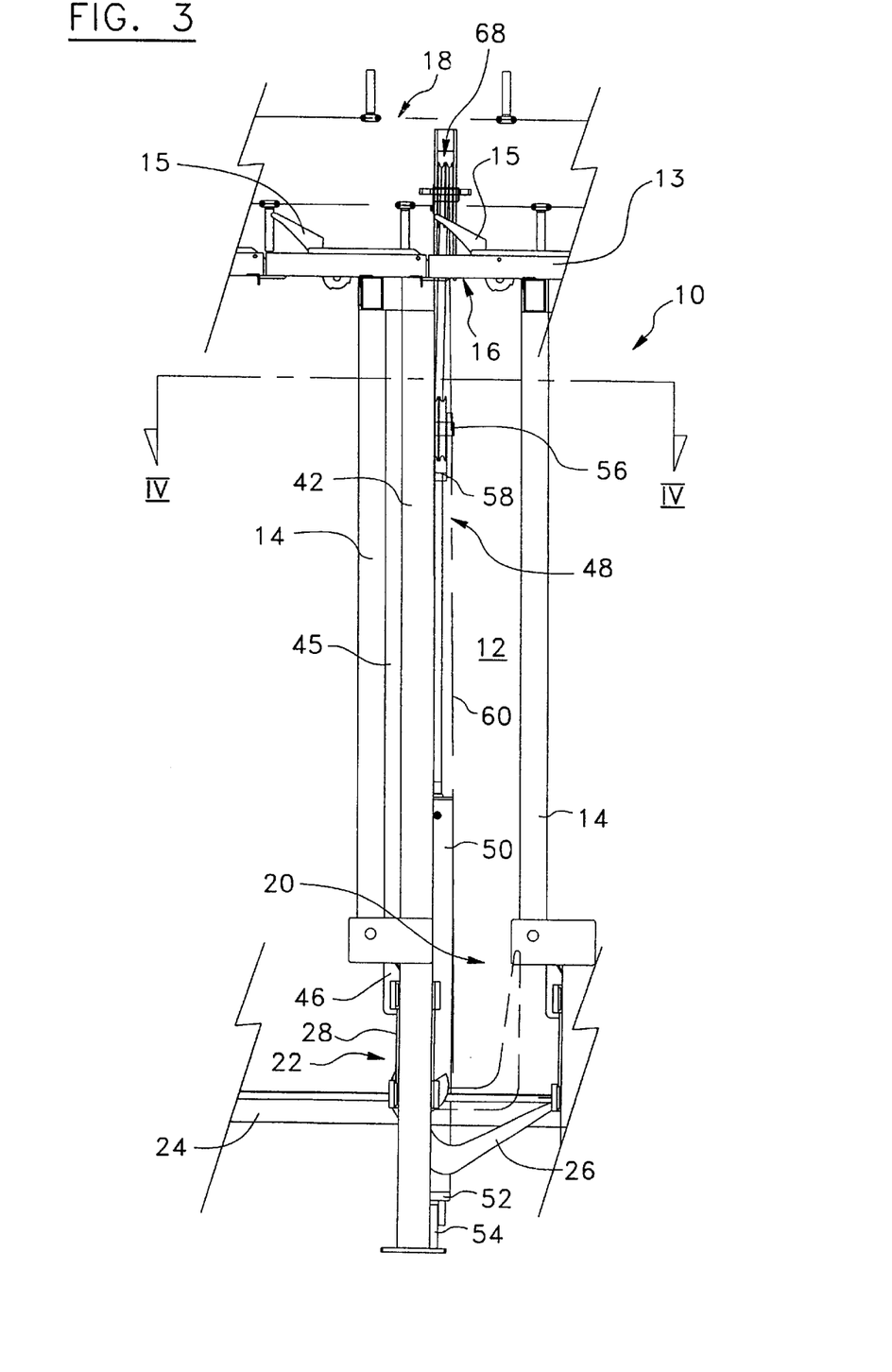
FIG. 3 is a side view of one of the sort bins shown in FIG. 1.
Figure 4:
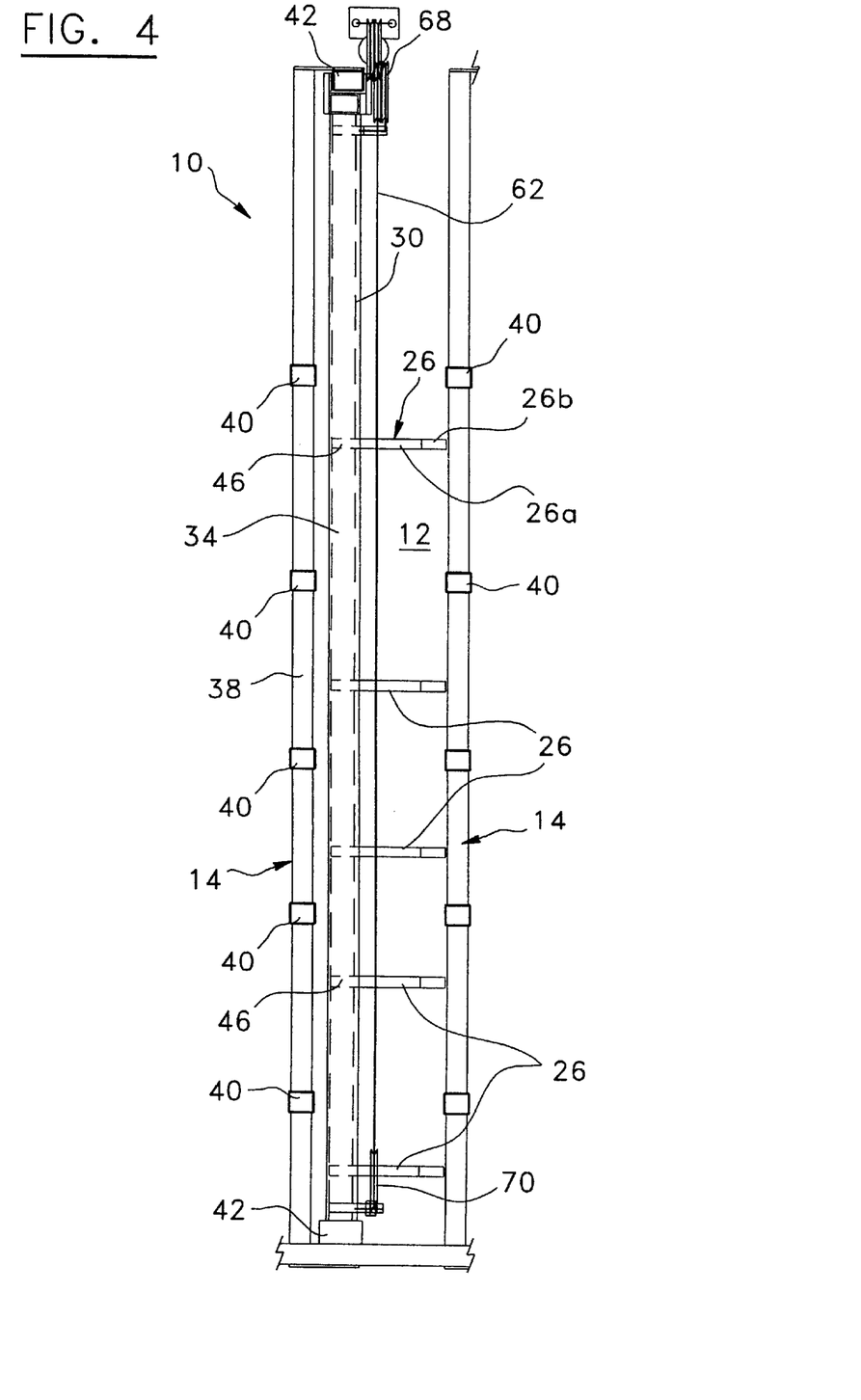
FIG. 4 is a cross-sectional top view of the sort bin of FIG. 3 taken along line IV—IV.

Referring also to FIGS. 3 and 4, each sort bin (10) comprises a compartment (12) defined by a first and a second spaced-apart walls (14). As can be appreciated, the first wall (14) of an in between sort bin (for example sort bin (10b) in FIG. 1) also defines the second wall of an immediately preceding sort bin (10a) and the second wall (14) of that in between sort bin (10b) defines the first wall of the immediately succeeding sort bin (10c).

The compartment (12) of each sort bin (10) has an entry (16) at an upper end portion for receiving lumber pieces (4) dropped from a conventional overhead conveyor (18) and an exit (20) located at a bottom portion of the compartment (12). As for the prior art sorter shown in FIG. 6, the lumber pieces could be carried on a overhead floor (13) provided with a trap opening (15). Other means, such as the ones described in U.S. Pat. Nos. 4,195,737; 2,993,133; 3,696,948; or 3,913,744, could be used to convey the lumber pieces over the sort bins (10).

Turning back to FIG. 1, a support (22) movable between a raised position and a lower position is provided between the walls (14) of each sort bin (10) for supporting the lumber pieces (4) in a pile (19), as shown in sort bin (10d). The support (22) lowers gradually as the sort bin (10) is filled up with more lumber pieces (4). When a given quantity of lumber pieces (4) has been collected in one sort bin, this quantity is discharged on an unloading conveyor (24) situated beneath the exit (20) of the sort bin (10) and spaced apart therefrom to be transported to a location where the lumber pieces (4) are further handled, as shown in the sequence of sort bins (10d) to (10f).

Figure 5A:
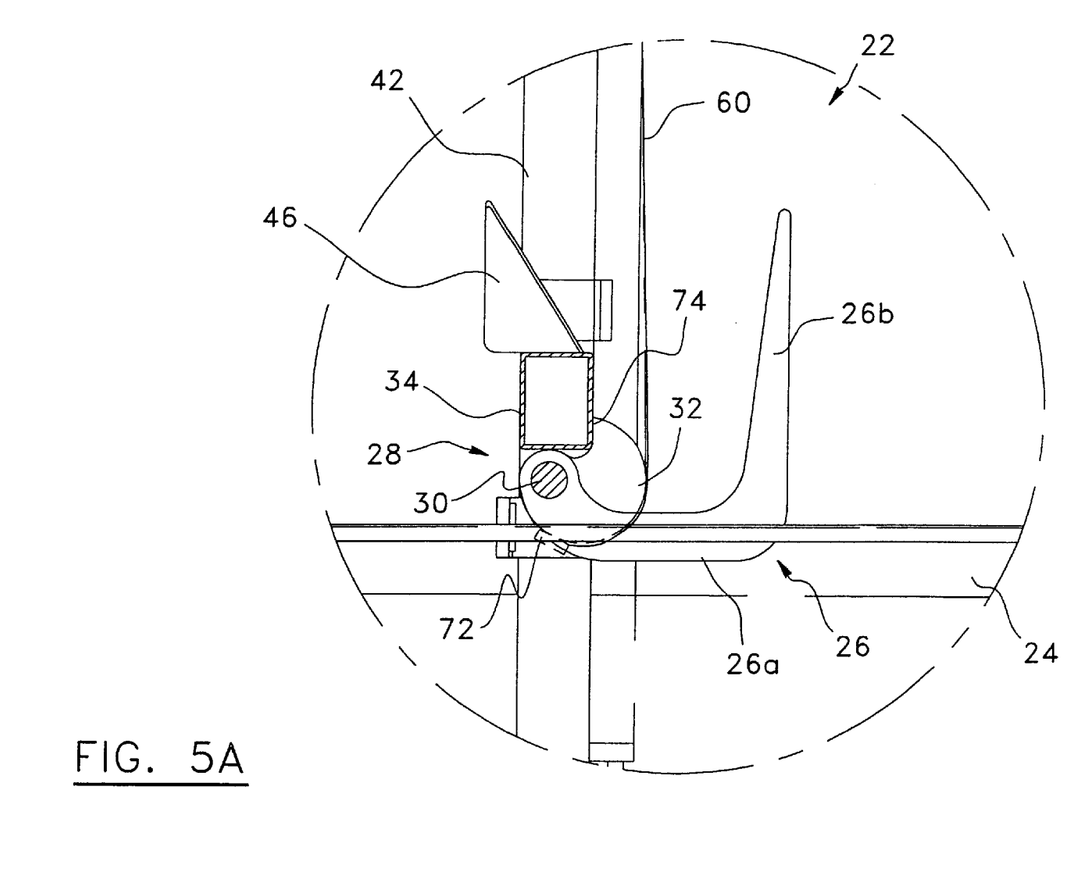
FIGS. 5A and 5B are enlarged cross-sectional side views along line V—V of FIG. 2 showing the support in circle A of FIG. 1 in the standard position (FIG. 5A) and in the unloading position (FIG. 5B)
Figure 5B:
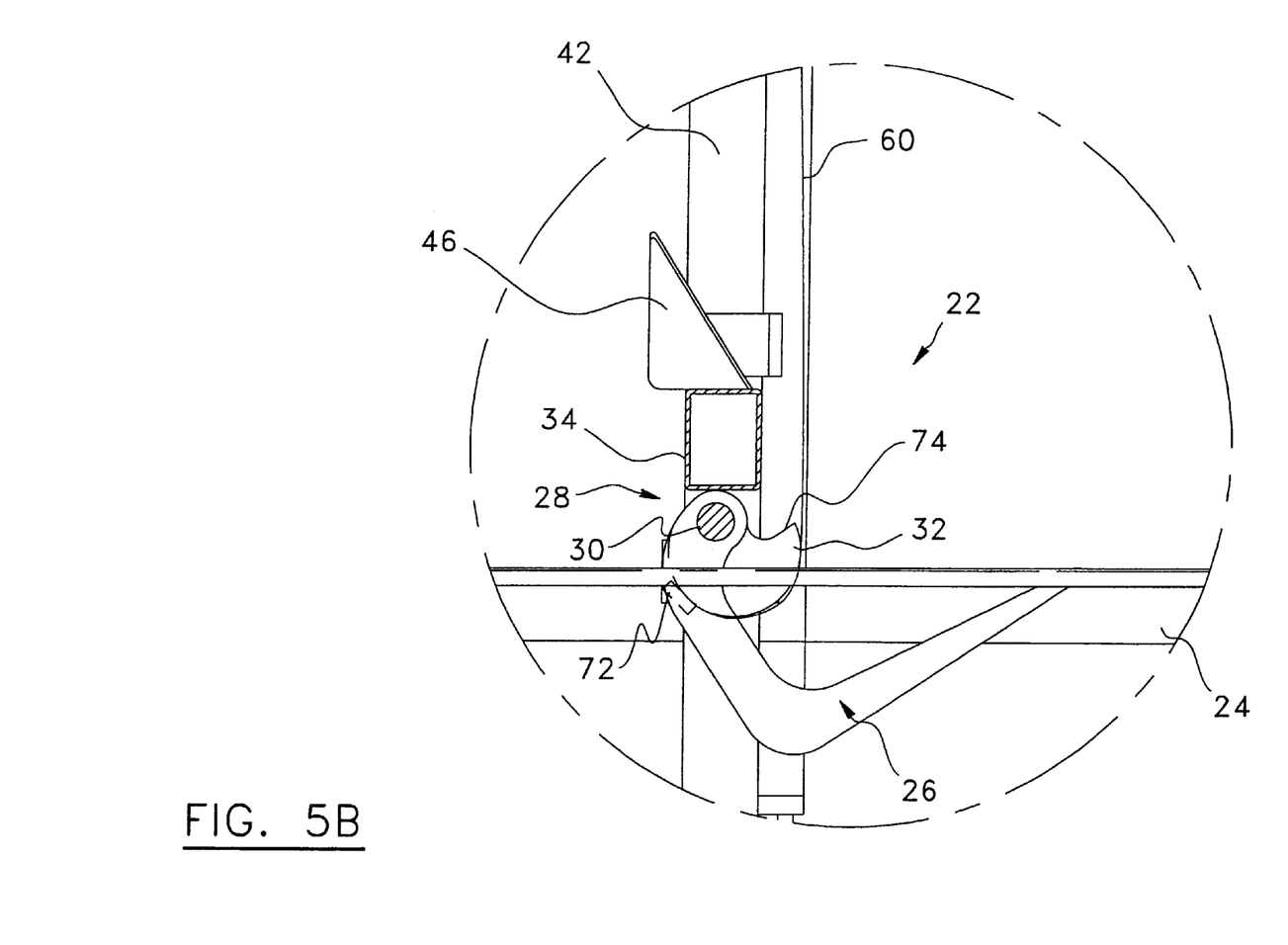

Referring to sort bin (10a) and (10b) in FIG. 1, the support (22) is movable along a course extending between an upper position (see sort bin 10a) adjacent to the entry (16) and a lower position (see sort bin 10b) below the exit (20) of the compartment (12). Turning now also to FIGS. 5A and 5B, and sort bin (10d) in FIG. 1, the support (22) has a front side member (26) and a rear side member (28) for preventing a spill of lumber pieces (4) on the unloading conveyor (24) when the support (22) is in its lower position. It can be appreciated that both sides of the bottom of the pile (19) are supported or held by the side members of the support (22), thereby preventing a spill of the lumber pieces (14) before the support (22) has reached the unloading conveyor (24). As it can also be appreciated, in the sequence of either sort bins (10a) to (10c) or (10d) to (10f), and in FIGS. 5A and 5B, one of the side members, in this instance, the front side member (26), is pivotable between a standard position, as in sort bin (10a) or (10d), and FIG. 5A; and an unloading position, as in sort bin (10c) or (10f) and FIG. 5B.

Referring more particularly to FIGS. 5A and 5B, the pivotable side member (26) of the support is preferably generally L-shaped. It includes a floor section (26a) having an end pivotally connected to the other side member (28) and a lateral section (26b) extending from the floor section (26a). The lateral section (26b) preferably has a length sufficient to close a gap spacing the exit (20) of the compartment (12) and the unloading conveyor (24) when the support is in the lower position.

The present invention is not limited to that particular design of support. In another embodiment of the invention, not illustrated, the support may have another design, as long as it has side members for holding the bottom of the pile as the support is moved further below the exit of the compartment, and as long as one of these side members is pivotable to allow the discharge of the lumber pieces on the unloading conveyor. For example, the pivotable side member could be a straight member having a free upper end, and a lower end pivotally connected to an L-shaped side member. The support could also have a V shape in the standard position formed by two side members pivotally connected to each other.

Referring more particularly to FIG. 2, where the support (22) is shown in both the upper position, in dotted lines, and the lower position, and FIG. 4, the pivotable side member (26) preferably consists of a series of L-shaped members (26) as defined above, mounted in a row transversal to the walls (14) and pivoting in tandem with each other. The L-shaped side members (26) are pivotally keyed to a common transversal pivot shaft (30). Referring also to FIGS. 5A and 5B, the support (22) further comprises a stop block (32) associated with the pivotable side member (26) for preventing the same from pivoting further towards the other side member (28) once in the standard position. Preferably, a stop block (32) is mounted at each end of the pivot shaft (30). A preferred version of the stop block will be described in more detail further below.

Turning to FIGS. 3 and 4, the walls (14) of each sort bin are preferably constructed with an upper horizontal beam (36), a lower horizontal beam (38), and a plurality of vertical beams (40). The horizontal beams (36 and 38) are supported between spaced-apart vertical columns (42). These beams and columns are assembled by welding, riveting, bolting or any other means as will be apparent to a person in the art. The rear side member (28) of the support (22) is preferably constructed with a side plate (34) transversal to the walls (14) and slidably mounted between the vertical columns (42) so as to allow movement of the support (22) between the upper position and the lower position. Conventional rollers, plastic guides or any other means, as will be apparent to those skilled in the art, could be used to slidably connect the side plate (34) to the columns (42).

The side plate (34) of each sort bin (10) extends directly above the pivot shaft (30), preferably slightly remote from the first wall (14) of the corresponding sort bin, in order to set as best as possible the centre of gravity of the pile above the pivot joint of the two side members (26,28), thereby limiting the load on that joint, as it can be appreciated in sort bin (10d), for example. Angled brackets (46) extending between an upper end of the side plate (34) and the first wall (14) are provided to close the gap (45) defined between the first wall (14) and the side plate (34), as shown in FIG. 3. Each bracket (46) has a lower end secured to the upper end of the (34). However, in another embodiment of the invention, the side plate and the pivot shaft could have been mounted closer to the first wall.

The sort bin (2) further comprises means for moving the support (22) between the upper and lower positions and pivoting means for pivoting the pivotable side member of the support between the standard position, where a bottom end portion of the pile is held, and the unloading position, where the lumber pieces of the pile are unloaded on the conveyor. Any type of suitable hydraulic, compressed air or electric mechanism can be used to control the movement of the support between the upper position and the lower position, and the pivotal movement of the side member. Different mechanisms could be used for these two purposes. However, the preferred embodiment illustrated allows the use of a single one. This mechanism (43) (shown only twice in FIG. 1) will now be described in detail.

Referring to FIGS. 1 and 2, a hydraulic or compressed air ram (50), is operatively connected to the support (22) for raising and lowering the same, and for pivoting the L-shaped side member (26) from its unloading position to its standard position. The ram (50) is securely mounted outside one of the vertical columns (42). The cylinder end (52) of the ram (50) can be secured to the column foot (54) by bolts. A first double-sheaved pulley block (56) is secured to the piston end (58) of the ram (50) and two cables (60,62) secured to an arrangement (64) on the column (42) pass around the first double-sheaved pulley block (56), then over a second double-sheaved pulley block (68) secured above the head of the column (42). Then, one of the cables (60) passes down along the column (42) to be secured to the support (22). The other cable (62) passes transversally above the top of the wall (14), over a pulley (70) mounted generally above the other column (42) and down along the same to be secured to the support (22).

Referring more particularly to FIGS. 5A and 5B, the end (72) of each cable (60,62) is preferably secured to a lower portion of a respective stop block (32) mounted at each end of the pivot shaft (30). Each of the stop blocks (32) has a generally semicircular shape with an upper straight portion (74) for abutting the side plate (34) as the L-shaped member (26) is in the standard position, as in FIG. 5A. The end of each cable passes along the curved portion of its corresponding stop block (32) to be secured to a lower portion thereof.

Explaining briefly the operation of the apparatus, lumber pieces (4) to be sorted are carried over the sorter (2) on a floor (13) provided with a controllable trap opening (15) above the entry of each sort bin (10). At such time as a lumber piece (4) is carried by the conveyor over its corresponding sort bin (10), the opening trap (15) opens and the lumber piece (4) is dropped into the bin (10). When the sort bin (10) is empty, as for example sort bin (10a) in FIG. 1, the ram (50) associated therewith is contracted and the associated support (22) is moved in its upper position adjacent to the entry (16) of the sort bin (10). As the sort bin (10) is filling up with more lumber pieces (4), the support (22) is gradually moved downward by extending the ram (50) until it reaches the exit (20) of the sort bin (10). When it is time to discharge the lumber pieces (4) on the unloading conveyor (24), the support (22) is lowered to its lower position. As it can be best appreciated in sort bin (10d) of FIG. 1, and FIGS. 5A and 5B, at one moment in the move downward of the support (22) toward the lower position, the floor section (26a) of the L-shaped members (26) reaches the level of the unloading conveyor (24) and passes between the chains thereof, whereby the load of the pile (19) held by the support (22) is transferred to the unloading conveyor (24). Then, as shown in sort bin (10e), the ram (50) is further extended and the load of the lumber pieces (4) causes a tip up of the L-shaped member (26) towards the unloading position, as shown in sort bin (10e) and (10f). All the lumber pieces (4) in the pile (19) are then discharged on the conveyor (24) and carried towards another station of the mill. The L-shaped member (26) is then pivoted to its standard position by contracting the ram (50) and the support (22) is moved to its upper position by further contracting the same.

Instead of using a single mechanism to raise and lower the support and to pivot the same, as described above, independent mechanisms as will be apparent to those skilled in the art could have been used. For example, a suitable controllable hydraulic or compressed-air cylinder having one end secured to one of the side members of the support and another end secured to the pivoting member could be used.

Although a preferred embodiment of the invention has been described in detail herein and illustrated in the accompanying drawings, it is to be understood that the invention is not limited to this precise embodiment and that various changes and modifications may be effected therein without departing from the scope or spirit of the invention as defined in the appended claims.

What is claimed is:

1. A sort bin for unloading sorted lumber pieces onto a conveyor, comprising:

a compartment having first and second spaced-apart walls for containing the lumber pieces in a pile, an entry located at an upper portion of the compartment for introducing lumber pieces into the compartment, and an exit located at a bottom portion of the compartment, the conveyor being below the exit and spaced apart therefrom;

a support for supporting the pile of lumber pieces contained in the compartment, the support being movable along a course extending between an upper position adjacent to the entry and a lower position below the exit of the compartment, the support having side members for preventing a spill of lumber pieces on the conveyor when the support is in its lower position, one of the side members being pivotable between a standard position and an unloading position;

means for moving the support between the upper and lower positions; and pivoting means for pivoting the pivotable side member of the support between the standard position, where a bottom end portion of the pile is held, and the unloading position, where the lumber pieces of the pile are unloaded onto the conveyor;

wherein the pivotable side member of the support is generally L-shaped and includes: a floor section member; and a lateral section extending from the floor section; and wherein the lateral section has a length sufficient to close a gap spacing the exit of the compartment and conveyor, when the support is in the lower position.

2. A sort bin as claimed in claim 1, wherein the pivotable side member of the support is connected to the other side member by means of a pivot shaft.

3. A sort bin as claimed in claim 2, comprising a stop block associated with the pivotable side member for preventing the same from pivoting further towards the other side member, once in the standard position.

4. A sort bin as claimed in claim 3, wherein the pivoting means comprises:

a pulley mechanism operatively associated with a ram, the pulley mechanism comprising a cable with an end secured to the stop block.

5. A sort bin as claimed in claim 4, wherein the means for moving the support comprises the pulley mechanism of the pivoting means.

6. A sort bin as claimed in claim 1, wherein the L-shaped member of the support consists of a plurality of L-shaped units mounted in a row transverse to the walls, and moving in tandem with each other.

7. A lumber sorter for unloading sorted lumber pieces onto a conveyor, comprising:

a plurality of sort bins, comprising:

a compartment having first and second spaced-apart walls for containing the lumber pieces in a pile, an entry located at an upper portion of the compartment for introducing lumber pieces into the compartment, and an exit located at a bottom portion of the compartment, the conveyor being below the exit and spaced apart therefrom;

a support for supporting the pile of lumber pieces contained in the compartment, the support being movable along a course extending between an upper position adjacent to the entry and a lower position below the exit of the compartment, the support having side members for preventing a spill of lumber pieces onto the conveyor when the support is in its lower position, one of the side members being pivotable between a standard position and an unloading position;

means for moving the support between the upper and lower positions; and pivoting means for pivoting the pivotable side member of the support between the standard position, where a bottom end portion of the pile is held, and the unloading position, where the lumber pieces of the pile are unloaded onto the conveyor;

wherein the plurality of sort bins is disposed in a row such that the first wall of one sort bin is the second wall of an immediately preceding sort bins, and the second wall of said one sort bin is the first wall of an immediately succeeding sort bin; and wherein the pivotable side member of the support is generally L-shaped and includes:
 a floor section member and
 a lateral section extending from the floor section; and
 wherein the lateral section has a length sufficient to close a gap spacing the exit of the compartment and the conveyor, when the support is in the lower position.

* * * * *